United States Patent [19]

Okumura et al.

[11] Patent Number: 4,550,699

[45] Date of Patent: Nov. 5, 1985

[54] INTAKE DEVICE OF AN INTERNAL COMBUSTION ENGINE

[75] Inventors: Takeshi Okumura; Tomio Warashina; Kiyoshi Nakanishi, all of Susono, Japan

[73] Assignee: Toyota Jidosha Kabushiki Kaisha, Aichi, Japan

[21] Appl. No.: 679,066

[22] Filed: Dec. 6, 1984

[30] Foreign Application Priority Data

Jan. 13, 1984 [JP] Japan .................................. 59-3551

[51] Int. Cl.$^4$ .............................................. F02B 31/00
[52] U.S. Cl. ................................ 123/308; 123/188 M; 123/52 M
[58] Field of Search ............... 123/308, 188 M, 52 M, 123/432, 306

[56] References Cited

U.S. PATENT DOCUMENTS

| | | | |
|---|---|---|---|
| 3,154,059 | 10/1964 | Witzky et al. | 123/308 |
| 4,246,874 | 1/1981 | Nakagawa et al. | 123/308 |
| 4,256,062 | 3/1981 | Schäfer | 123/308 |
| 4,485,775 | 12/1984 | Kanda | 123/308 |

FOREIGN PATENT DOCUMENTS

| | | |
|---|---|---|
| 54964 | 6/1982 | European Pat. Off. . |
| 70914 | 5/1982 | Japan . |
| 105534 | 7/1982 | Japan . |

*Primary Examiner*—E. Rollins Cross
*Attorney, Agent, or Firm*—Parkhurst & Oliff

[57] ABSTRACT

An engine in which the cylinders are each provided with a first intake valve, a second intake valve and an intake passage common to the first and second intake valves. The intake passage is divided into a central passage and two side passages located on each side of the central passage by two side separating walls, which extend from the valve stem guides of the first and second intake valves toward the upstream of the intake passage. The downstream end portion of the central passage is divided into two branch passages. Each of the branch passages is in communication with the corresponding side passage via an opening formed in the corresponding side separating wall. A fuel injector is arranged in the central passage, and a control valve is arranged in the central passage upstream of the fuel injector and opens when the engine is operating under a heavy load.

16 Claims, 5 Drawing Figures

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Related Art

In order to create a swirl motion in the combustion chamber when the engine is operating under a light load and to obtain a high volumetric efficiency when the engine is operating under a heavy load at a high speed, it is well known, to equip each cylinder in an engine with a pair of intake valves, and to arrange a fuel injection in an intake passage. The intake passage is divided into two branch intake passages at a position downstream of the fuel injector, and these branch intake passages are connected to the combustion chamber via the corresponding intake valves. A control valve which is closed when the engine is operating under a light load is arranged in one of the branch intake passages (See Japanese Unexamined Patent Publication (Kokai) No. 57-70914). In the above arrangement, when the engine is operating under a light load, and since the control valve is closed, air is fed into the combustion chamber from only one of the branch intake passages, thus creating a swirl motion in the combustion chamber. Conversely, when the engine is operating under a heavy load, and since the control valve is open, air is fed to the combustion chamber from both branch intake passages, and a high volumetric efficiency can be obtained. However, since the fuel injector is arranged upstream of the control valve, some of the fuel injected from the fuel injector when the control valve is closed adheres to the control valve. Therefore, since all of the fuel injected from the fuel injector is not instantaneously fed into the combustion chamber, a good accelerating operation cannot be obtained.

Also, since a swirl motion is created in the combustion chamber when the engine is operating under a light load, the burning velocity of the air-fuel mixture in the combustion chamber can be improved. However, in the above arrangement, ignitability is neglected.

Also, well known is an engine in which each cylinder is equipped with a pair of intake valves and a pair of independently arranged intake passages. A control valve which is closed when the engine is operating under a light load is arranged in one of the intake passages. The intake passages are interconnected via a connecting hole at a position downstream of the control valve, and the fuel injector is arranged in the connecting hole (See Japanese Unexamined Patent Publication No. 57-105534). In this engine, when the engine is operating under a heavy load, and since the control valve is open, air is fed to the combustion chamber from both intake passages, and a high volumetric efficiency can be obtained. In addition, since the fuel injector is arranged downstream of the control valve, there is no danger that fuel injected from the fuel injector will adhere to the control valve.

However, in this engine, since the intake passages are interconnected at a position downstream of the control valve, air is fed to the combustion chamber from both intake passages even if the control valve is closed when the engine is operating under a light load. As a result, the velocity of the air flowing into the combustion chamber is inevitably reduced, and, since it is difficult to create a strong swirl motion in the combustion chamber, it is impossible to sufficiently increase the burning velocity of the air-fuel mixture in the combustion chamber. In this engine, also ignitability is neglected.

SUMMARY OF THE INVENTION

An object of the present invention is to provide an internal combustion engine capable of creating a strong turbulence in the combustion chamber when the engine is operating under a light load while obtaining a high volumetric efficiency when the engine is operating under a heavy load at a high speed, and also capable of obtaining a good ignitability and a good accelerating operation.

According to the present invention, there is provided an internal combustion engine in which the cylinders are each provided with a first intake valve, a second intake valve, an intake passage common to the first and second intake valves, a first valve stem guide projects into the intake passage and supports the first intake valve, and a second valve stem guide projects into the intake passage and supports the second intake valve. The intake passage has a first side wall extending from an outer periphery of the first intake valve toward the upstream of the intake passage and a second side wall extending from an outer periphery of the second intake valve toward the upstream of the intake passage. The engine comprises: a first side separating wall extending in the intake passage from the first valve stem guide toward the upstream of said intake passage, and a second side separating wall extending in the intake passage from the second valve stem guide toward the upstream of the intake passage; wherein the first side separating wall and the second side separating wall define a first side passage between the first side separating wall and the first side wall of the intake passage, a second side passage between the second side separating wall and the second side wall of the intake passage, and a central passage between the first side separating wall and the second side separating wall. A central separating wall extends between the first intake valve and the second intake valve and between the first side separating wall and the second side separating wall at a downstream end portion of the central passage, whereby the central separating wall defines a first branch passage between the central separating wall and the first side separating wall and defines a second branch passage between the central separating wall and the second side separating wall, the first side separating wall has a first opening interconnecting between the first side passage and the first branch passage, and the second side separating wall has a second opening interconnecting between the second side passage and the second branch passage. A fuel injector is arranged in the central passage upstream of the central separating wall, and a control valve is arranged in the central passage upstream of the fuel injector; the valve opening when the engine is operating in a predetermined operating state.

The present invention may be more fully understood from the description of a preferred embodiment of the invention set forth below, together with the accompanying drawings.

DESCRIPTION OF THE PREFERRED EMBODIMENT

Figure 1:
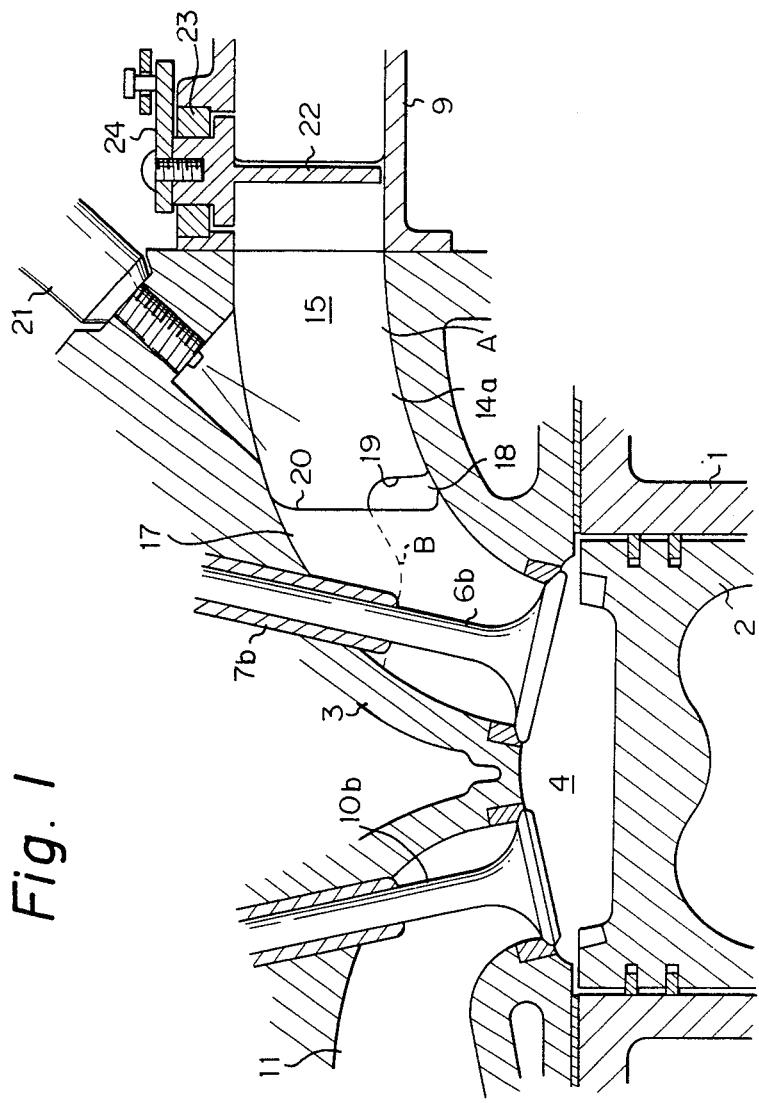
FIG. 1 is a cross-sectional side view of an internal combustion engine according to the present invention, taken along the line I—I in FIG. 2.
Figure 2:
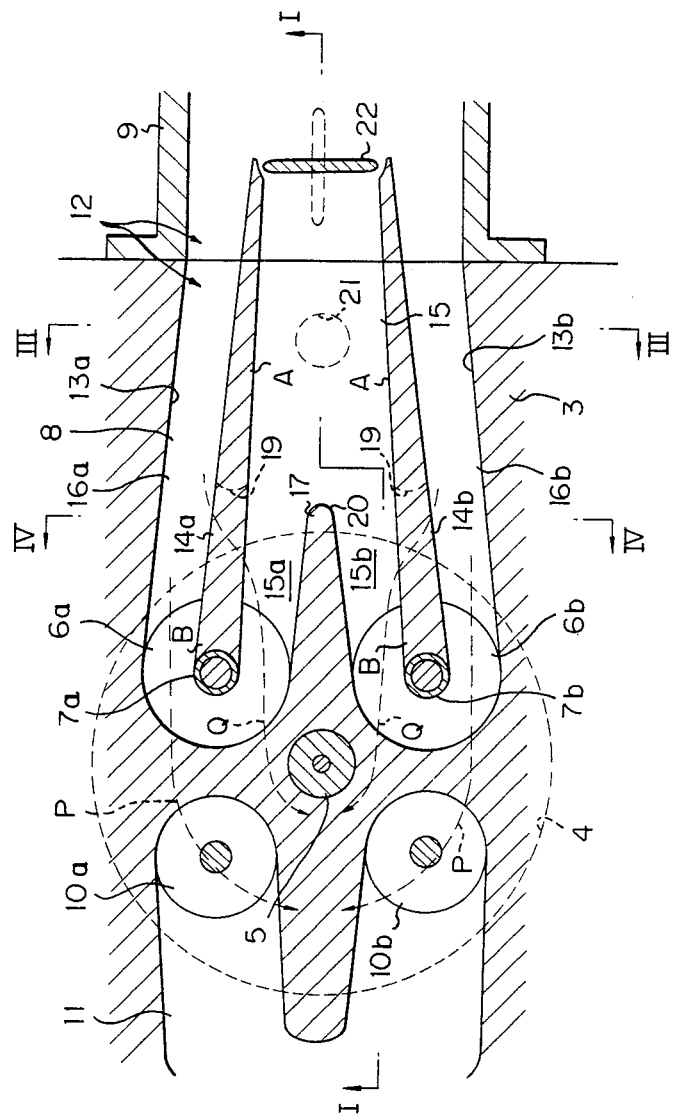
FIG. 2 is a cross-sectional plan view of the engine illustrated in FIG. 1.
Figure 3:
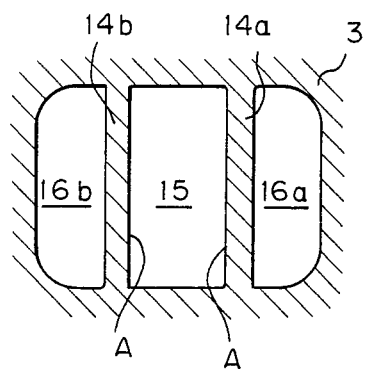
FIG. 3 is a cross-sectional view taken along the line III—III in FIG. 2.
Figure 4:
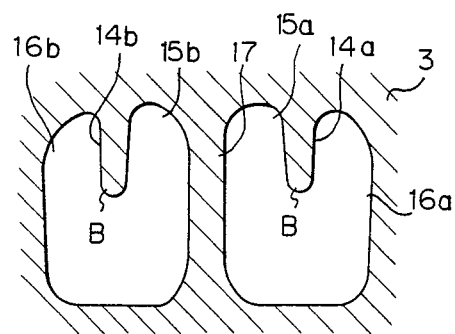
FIG. 4 is a cross-sectional view taken along the line IV—IV in FIG. 2.

Referring to FIGS. 1 and 2, reference numeral 1 designates a cylinder block, 2 a piston reciprocally movable in the cylinder block 1, 3 a cylinder head fixed to the cylinder block 1, and 4 a combustion chamber; 5 designates a spark plug arranged in the combustion chamber 4 at the center thereof, 6a a first intake valve, 6b a second intake valve, 7a a stem guide of the first intake valve 6a, and 7b a stem guide of the second intake valve 6b; 8 designates an intake port formed in the cylinder head 3, 9 a manifold branch, 10a a first exhaust valve, 10b a second exhaust valve, and 11 an exhaust port. The intake port 8 and the manifold branch 9 form an intake passage 12. As illustrated in FIG. 2, the opposing side walls 13a and 13b of the intake port 8 extend on a tangential line from the outer peripheries of the corresponding intake valves 6a and 6b, and also diverge toward the intake valves 6a, 6b. A first side separating wall 14a and a second side separating wall 14b are formed in the intake passage 12. The first side separating wall 14a extends to the interior of the manifold branch 9 from the stem guide 7a towards the upstream in a line substantially parallel to the side wall 13a, and the second side separating wall 14b extends to the interior of the manifold branch 9 from the stem guide 7b toward the upstream in a line substantially parallel to the side wall 13b. Consequently, the interior of the intake passage 12 is divided into three passages; that is, a central passage 15 is located between the separating walls 14a, 14b and a pair of side passages 16a, 16b are located on each side of the central passage 15 by means of the side separating walls 14a, 14b. The side passages 16a, 16b have an approximately uniform transverse width over the entire length thereof and extend in a substantially straight line, and the central passage 15 diverges toward the intake valves 6a, 6b. A central separating wall 17 centrally extending between the separating walls 14a, 14b at a position between the intake valves 6a and 6b is formed in the downstream end portion of the central passage 15, and the downstream end portion of the central passage 15 is divided into two branch passages 15a, 15b by the central separating wall 17. The length of the central separating wall 17 is approximately one half the lengths of the side separating walls 14a, 14b and, as illustrated in FIGS. 1 and 4, the central separating wall 17 extends from the upper wall to the lower wall of the intake port 8.

As illustrated in FIGS. 1 through 4, the upstream portions A of the side separating walls 14a, 14b extend from the upper wall to the lower wall of the intake port 8, and the downstream portions B of the side separating walls 14a, 14b, which are arranged adjacent to the central separating wall 17, extend from the upper wall of the intake port 8 to a point halfway up the height of the intake port 8. Consequently, openings 18 interconnecting the central passage 15 to the side passages 16a, 16b are formed beneath the downstream portions B of the side separating walls 14a, 14b. As can be seen from FIGS. 1 and 2, the upstream ends 19 of the openings 18 are located upstream of the upstream end 20 of the central separating wall 17. A fuel injector 21 is arranged on the upper wall of the central passage 15 upstream of the upstream end 20 of the central separating wall 17, and fuel is injected from the fuel injector 21 toward the upstream end 20 of the central separating wall 17. A control valve 22 shaped in the form of a butterfly valve is arranged in the upstream end of the central passage 15, that is, the inlet portion thereof. The control valve 22 is rotatably supported by a valve holder 23 fixed to the manifold branch 9, and an arm 24 is fixed to the upper end of the control valve 22.

Figure 5:
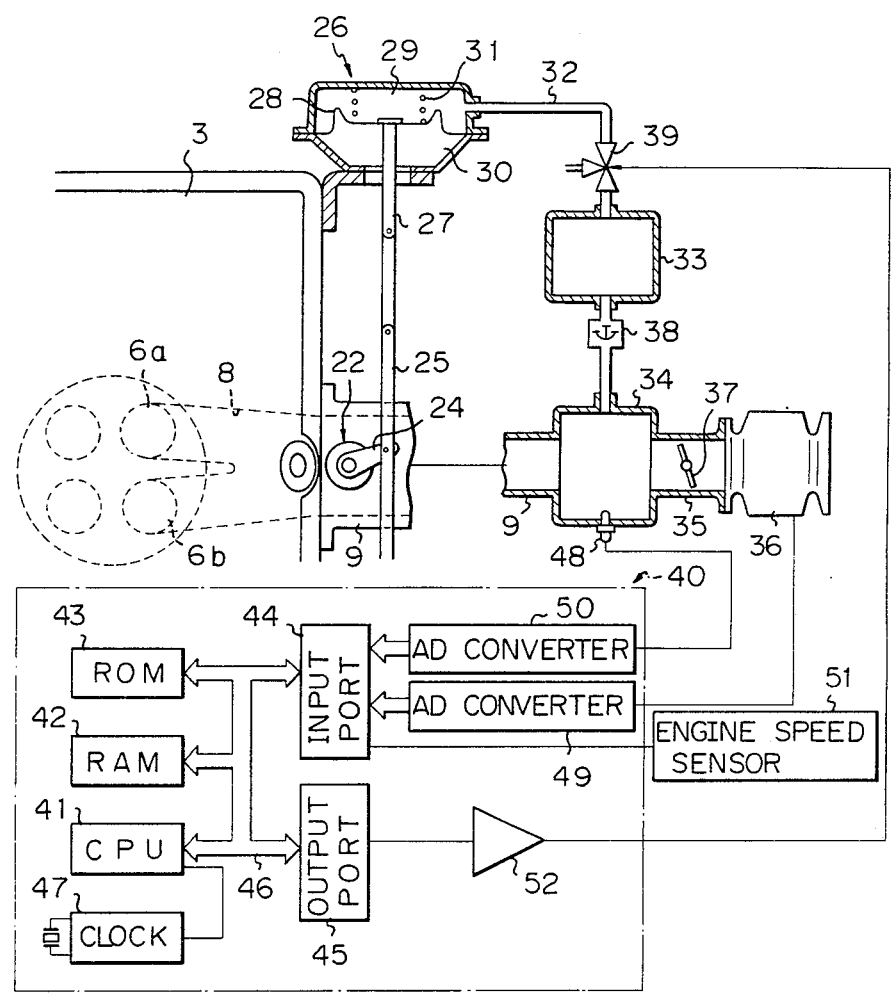
FIG. 5 is a schematically illustrated plan view of the engine according to the present invention.

Referring to FIG. 5, the tips of the arms 24 of the control valves 22 are connected to a control rod 27 of an actuator 26 via a common connecting rod 25. The actuator 26 comprises a vacuum chamber 29 and an atmopsheric pressure chamber 30, which are separated by a diaphragm 28, and the control rod 27 is connected to the diaphragm 28. A compression spring 31 for biasing the diaphragm is arranged in the vacuum chamber 29, and the vacuum chamber 29 is connected to a vacuum tank 33 via a vacuum conduit 32. The manifold branch 9 is connected to an air flow meter 36 via a surge tank 34 and an intake duct 35, and a throttle valve 37 is arranged in the intake duct 35. The vacuum tank 33 is connected to the surge tank 34 via a check valve 38, which permits the outflow of air from the vacuum tank 33 towards the surge tank 34, and thus, the interior of the vacuum tank 33 is maintained at a maximum vacuum produced in the surge tank 34. A solenoid valve 39, which is able to open to the outside air, is arranged in the vacuum conduit 32 interconnecting the vacuum chamber 29 of the actuator 26 to the surge tank 33. This solenoid valve 39 is connected to an electronic control unit 40.

The electronic control unit 40 is constructed as a digital computer and, as illustrated in FIG. 5, comprises a microprocessor (CPU) 41 carrying out the arithmetic and logic processing, a random-access memory (RAM) 42, a read-only memory (ROM) 43 storing a predetermined control program and arithmetic constant therein, and an input port 44 and output port 45, which are interconnected to each other via a bidirectional bus 46. In addition, the electronic control unit 40 comprises a clock generator 47 generating various clock signals. The air flow meter 36 and a vacuum sensor 48 are connected to the input port 44 via corresponding AD converters 49, 50 and, in addition, an engine speed sensor detecting the engine speed is connected to the input port 44. The output port 45 is connected to the solenoid of the solenoid valve 39 via a power amplifier 52.

In the embodiment illustrated in FIG. 5, the solenoid of the solenoid valve 39 is deenergized when the level of vacuum in the surge tank 34 is greater than a predetermined level, that is, when the engine is operating under a light load, and the solenoid of the solenoid valve 39 is energized when the level of vacuum in the surge tank 34 is smaller than the predetermined level, that is, the engine is operating under a heavy load. When the solenoid of the solenoid valve 39 is deenergized, the vacuum chamber 29 of the actuator 26 is open to the outside air via the solenoid valve 39. At this time, as illustrated in FIG. 2, the control valve 22 closes the inlet portion of the central passage 15. Conversely, when the solenoid of the solenoid valve 39 is energized, the vacuum chamber 29 of the actuator 26 is connected to the vacuum tank 33. At this time, the diaphragm 28 moves toward the vacuum chamber 29 against the compression spring 31. As a result of this, the control valve 22 is rotated and opens the inlet portion of the central passage 15 to the maximum extent, as illustrated by the broken line in FIG. 2. As mentioned above, the control valve 22 closes the inlet portion of the central passage 15 when the engine is operating under a light load, and the control valve 22 opens the inlet portion of the central passage 15 to the maximum extent when the engine is operating under a heavy load.

When the engine is operating, fuel injected from the fuel injector 21 is uniformly distributed into the branch passages 15a and 15b. At this time, if the engine is operating under a light load, the control valve 22 closes the inlet portion of the central passage 15 as mentioned above. Consequently, at this time, a large part of the air flows straight into the combustion chamber 4 from the side passages 16a, 16b, as illustrated by the arrow P in FIG. 2. The remaining small part of the air flows into the branch passages 15a, 15b from the side passages 16a, 16b via the openings 18 (FIG. 1), as illustrated by the arrow Q in FIG. 2 and then flows into the combustion chamber 4. The air flowing into the combustion chamber 4 from the side passages 16a, 16b swirls along the circumferential inner wall of the combustion chamber 4 in opposite directions, as illustrated by the arrow P in FIG. 2 and the portions have opposite swirls come into head-on collision with each other, thus creating a strong turbulence in the combustion chamber 4. The air flowing into the branch passages 15a, 15b, as illustrated by the arrow Q in FIG. 2, is mixed with the fuel injected from the fuel injector 21, thus forming a rich air-fuel mixture. This rich air-fuel mixture flows into the central portion of the combustion chamber 4, thus filling the space around the spark plug 5 with the rich air-fuel mixture. Consequently, the air-fuel mixture in the combustion chamber 4 is easily ignited by the spark plug 5 and, in addition, since a strong turbulence is created in the combustion chamber 4 as mentioned above, the burning velocity is increased. Consequently, even when the engine is operating under a light load, it is possible to obtain a good ignitability and a stable combustion.

When the engine is operating under a heavy load, and since the control valve 22 opens the inlet portion of the central passage 15 to the maximum extent as mentioned above, air flows into the combustion chamber 4 via the central passage 15 and the side passages 16a, 16b. As illustrated in FIG. 2, the side passages 16a, 16b, the central passage 15, and the branch passages 15a, 15b extend in a substantially straight line, and thus the flow resistance of these passages is small. Consequently, the air flows smoothly within these passages and a high volumetric efficiency can be obtained.

In the embodiment illustrated in FIG. 5, the solenoid valve 39 is controlled in response to the level of vacuum in the surge tank 34. However, the solenoid valve 39 may be controlled in response to the output signal of the air flow meter or the engine speed sensor 51. That is, the control valve 22 may be open to the maximum extent by energizing the solenoid of the solenoid valve 39 in response to the output signal of the air flow meter 36 when the amount of air fed into the engine cylinders exceeds a predetermined amount, or the control valve 22 may be open to the maximum extent by energizing the solenoid of the solenoid valve 39 in response to the output signal of the engine speed sensor 51 when the engine speed exceeds a predetermined speed.

According to the present invention, when the engine is operating under a light load, a rich air-fuel mixture is formed around the spark plug and, in addition, a strong turbulence is created in the combustion chamber. As a result, since a good ignitability can be obtained and the burning velocity is increased, it is possible to obtain a stable combustion. When the engine is operating under a heavy load, and since air flows in a substantially straight line within the intake passage and then flows into the combustion chamber, the flow resistance of the air is small and it is possible to obtain a high volumetric efficiency. In addition, since a large part of the fuel injected from the fuel injector is instantaneously fed into the engine cylinders without adhering to the inner wall of the intake passage, it is possible to obtain a good accelerating operation.

While the invention has been described by reference to a specific embodiment chosen for purposes of illustration, it should be apparent that numerous modifications could be made thereto by those skilled in the art without departing from the basic concept and scope of the invention.

We claim:

1. An internal combustion engine having cylinders each having a first intake valve, a second intake valve, an intake passage common to said first and second intake valves, a first valve stem guide projecting into the intake passage and supporting the first intake valve, and a second valve stem guide projecting into the intake passage and supporting the second intake valve, the intake passage having a first side wall which extends from an outer periphery of the first intake valve towards the upstream of the intake passage and having a second side wall which extends from an outer periphery of the second intake valve toward the upstream of the intake passage, said engine comprising:

a first side separating wall extending in said intake passage from said first valve stem guide toward the upstream of said intake passage;

a second side separating wall extending in said intake passage from said second valve stem guide toward the upstream of said intake passage, said first side separating wall and said second side separating wall defining a first side passage between said first side separating wall and said first side wall of said intake passage, a second side passage between said second side separating wall and said second side wall of said intake passage, and a central passage between said first side separating wall and said second side sepa-rating wall;

a central separating wall extending between said first intake valve and said second intake valve and between said first side separating wall and said second side separating wall at a downstream end portion of said central passage, said central separating wall defining a first branch passage between said central separating wall and said first side separating wall and defining a second branch passage between said central separating wall and said second side separating wall, said first side separating wall having a first opening which interconnects said first side passage to said first branch passage, said second side separating wall having a second opening which interconnects said second side passage to said second branch passage;

a fuel injector arranged in said central passage upstream of said central separating wall; and, a control valve arranged in said central passage upstream of said fuel injector and opening when the engine is operating in a predetermined operating state.

2. An internal combustion engine according to claim 1, wherein said first side wall and said second side wall of said intake passage diverge towards said first intake valve and said second intake valve.

3. An internal combustion engine according to claim 2, wherein said first side wall extends on a line tangential to the outer periphery of said first intake valve, and said second side wall extends on a line tangential to the outer periphery of said second intake valve.

4. An internal combustion engine according to claim 1, wherein said first side passage and said second side passage extend in a substantially straight line.

5. An internal combustion engine according to claim 4, wherein said first side passage and said second side passage have an approximately uniform transverse width over the entire length thereof.

6. An internal combustion engine according to claim 1, wherein said central passage extends in a substantially straight line.

7. An internal combustion engine according to claim 6, wherein said central passage has a transverse width which diverges toward said first intake valve and said second intake valve.

8. An internal combustion engine according to claim 1, wherein said first branch passage and said second branch passage extend in a substantially straight line.

9. An internal combustion engine according to claim 8, wherein said first branch passage and said second branch passage have an approximately uniform transverse width over the entire length thereof.

10. An internal combustion engine according to claim 1, wherein said first side separating wall and said second side separating wall comprise an upstream wall portion extending between an upper wall and a lower wall of said intake passage, and a downstream wall portion arranged adjacent to said central separating wall, and said first opening and said second opening are formed at lower portions of said corresponding downstream wall portions.

11. An internal combustion engine according to claim 10, wherein said first opening and said second opening have an upstream end located upstream of an upstream end of said central separating wall.

12. An internal combustion engine according to claim 1, wherein said fuel injector is arranged on an upper wall of said intake passage so as to inject fuel towards an upstream end of said central separating wall.

13. An internal combustion engine according to claim 1, wherein said control valve is actuated in response to an engine load and opens when the engine load exceeds a predetermined load.

14. An internal combustion engine according to claim 1, wherein said control valve is actuated in response to the amount of air fed into the cylinders and opens when said amount of air exceeds a predetermined amount.

15. An internal combustion engine according to claim 1, wherein said control valve is actuated in response to an engine speed and opens when the engine speed exceeds a predetermined speed.

16. An internal combustion engine according to claim 1, wherein each of said cylinders has a combustion chamber and a spark plug arranged at a center of the combustion chamber, and said central passage and said central separating wall are arranged to extend on a symmetrical axis passing through said center of the combustion chamber, and said first side separating wall, said first side passage and said first branch passage are arranged symmetrically with said second side separating wall, said second side passage and said second branch passage with respect to said symmetrical axis.

* * * * *